US007967091B2

(12) United States Patent
Yamazaki et al.

(10) Patent No.: US 7,967,091 B2
(45) Date of Patent: Jun. 28, 2011

(54) HYBRID ELECTRIC VEHICLE POWERTRAIN WITH ENGINE START AND TRANSMISSION SHIFT ARBITRATION

(75) Inventors: Mark Yamazaki, Canton, MI (US); Marvin Kraska, Dearborn, MI (US); Kathleen Bailey, Dearborn, MI (US); Natarajan Sureshbabu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1103 days.

(21) Appl. No.: 11/560,396

(22) Filed: Nov. 16, 2006

(65) Prior Publication Data
US 2008/0119975 A1 May 22, 2008

(51) Int. Cl.
*B60K 6/44* (2007.10)
*B60W 10/00* (2006.01)
(52) U.S. Cl. ............... 180/65.225; 180/65.265
(58) Field of Classification Search .............. 903/917, 903/930, 945; 477/43
See application file for complete search history.

(56) References Cited

U.S. PATENT DOCUMENTS

| | | | | |
|---|---|---|---|---|
| 5,720,690 | A * | 2/1998 | Hara et al. | 477/20 |
| 5,884,201 | A * | 3/1999 | Kawai | 701/22 |
| 6,090,007 | A * | 7/2000 | Nakajima et al. | 477/46 |
| 6,125,314 | A * | 9/2000 | Graf et al. | 701/53 |
| 6,183,389 | B1 | 2/2001 | Tabata | |
| 6,299,565 | B1 | 10/2001 | Jain et al. | |
| 6,514,172 | B2 * | 2/2003 | Kayano et al. | 477/110 |
| 6,560,522 | B2 * | 5/2003 | Katakura et al. | 701/54 |
| 6,569,059 | B1 * | 5/2003 | Ito | 477/110 |
| 6,735,502 | B2 | 5/2004 | Phillips et al. | |
| 6,746,366 | B2 | 6/2004 | Tamor | |
| 7,013,213 | B2 | 3/2006 | McGee et al. | |
| 7,021,409 | B2 * | 4/2006 | Tamor | 180/65.25 |
| 7,164,247 | B2 * | 1/2007 | Joe et al. | 318/432 |
| 7,214,156 | B2 | 5/2007 | Oliver | |
| 7,296,646 | B2 * | 11/2007 | Kawazoe et al. | 180/179 |
| 2002/0117339 | A1 * | 8/2002 | Nakashima | 180/65.4 |
| 2003/0001390 | A1 * | 1/2003 | Phillips et al. | 290/40 C |
| 2003/0074115 | A1 * | 4/2003 | Yamaguchi et al. | 701/22 |
| 2003/0089539 | A1 * | 5/2003 | Kadota | 180/65.2 |
| 2004/0192494 | A1 * | 9/2004 | Ozeki et al. | 477/3 |
| 2004/0259680 | A1 * | 12/2004 | Ozeki et al. | 477/3 |
| 2005/0029024 | A1 * | 2/2005 | Takami et al. | 180/65.3 |
| 2005/0054479 | A1 * | 3/2005 | Masterson et al. | 477/3 |
| 2005/0209046 | A1 * | 9/2005 | Potter | 477/115 |
| 2005/0247495 | A1 | 11/2005 | Tabata et al. | |
| 2006/0169503 | A1 * | 8/2006 | Oliver et al. | 180/65.2 |

FOREIGN PATENT DOCUMENTS

JP 2000255285 A * 9/2000
WO WO2005/123436 A1 12/2005

OTHER PUBLICATIONS http://research.sun.com (Website: http://web.archive.org/web/20050217170600/http://research.sun.com/projects/mackinac/mackinac_whitepaper.pdf).*
Sawase, et al. (JP 2002-255285 English Translation).*
Search Report Under Section 17(5) for GB0722265.6 dated Feb. 18, 2008.

* cited by examiner

*Primary Examiner* — J. Allen Shriver, II
*Assistant Examiner* — Chiedu A Chibogu
(74) *Attorney, Agent, or Firm* — David B. Kelley; Brooks Kushman P.C.

(57) ABSTRACT

A control method and control system for a hybrid electric vehicle powertrain with a multiple-ratio transmission is disclosed in which engine start events are separated in time from transmission ratio shift events to effect a smooth transition from an electric drive state with the engine off to a drive state in which the engine delivers driving power.

16 Claims, 4 Drawing Sheets

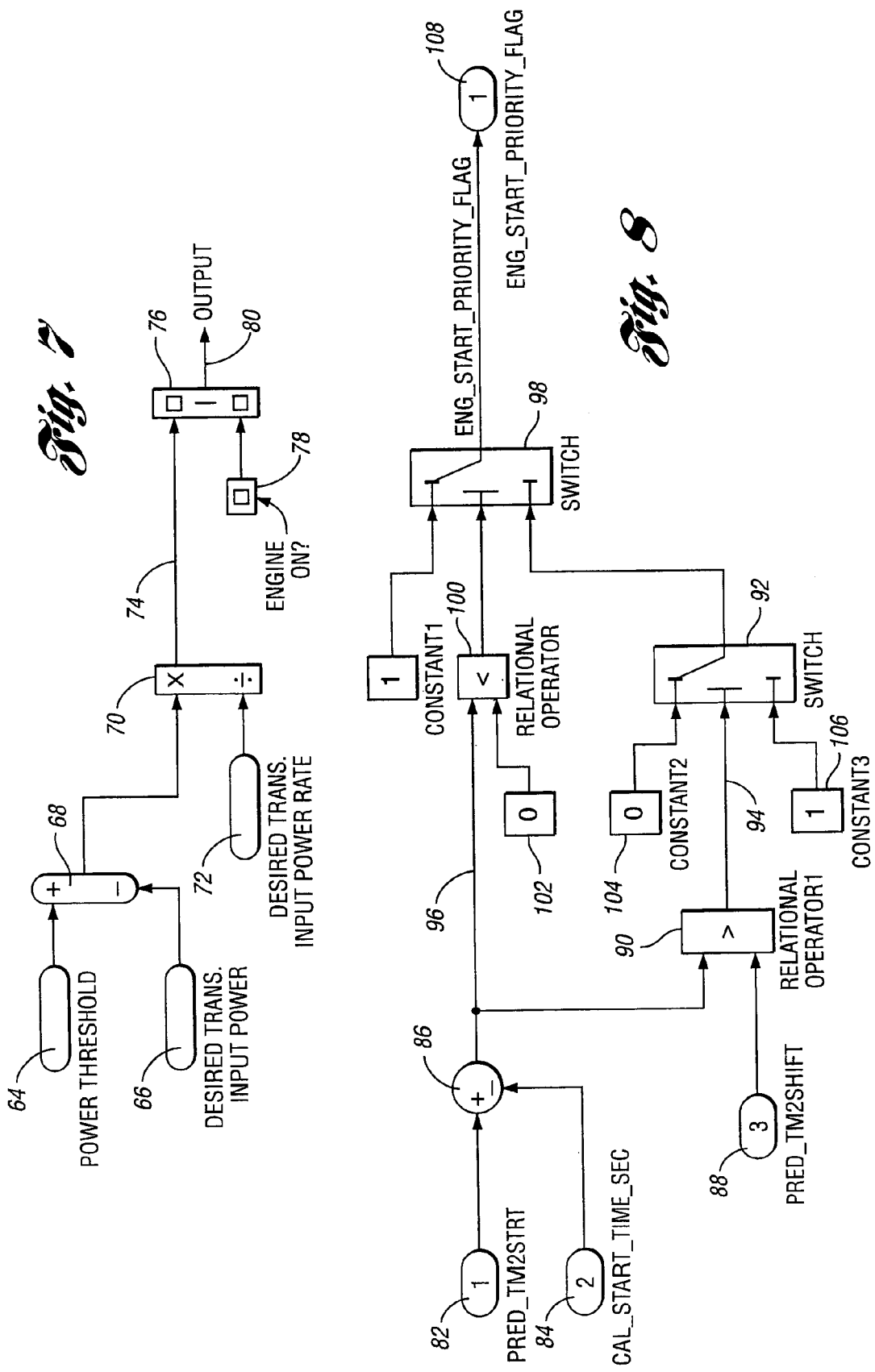

HYBRID ELECTRIC VEHICLE POWERTRAIN WITH ENGINE START AND TRANSMISSION SHIFT ARBITRATION

BACKGROUND OF THE INVENTION

1. Field of the Invention

The invention relates to a hybrid electric vehicle powertrain with separate power flow paths from an engine and from an electric motor to vehicle traction wheels through a multiple-ratio transmission.

2. Background Discussion

In a hybrid electric vehicle powertrain, there are two sources of power. One power source is an engine, which could be a spark ignition internal combustion gasoline engine, a diesel compression ignition engine, a gas turbine engine, a hydrogen fuel cell engine, etc. A second power source comprises at least one electric motor that is electrically coupled to a traction battery and to an electrical generator. Depending upon the operating mode of the powertrain, the generator may act as a motor and the motor may act as a generator. For example, the motor may provide charging voltage to the battery during an engine braking mode.

The two power sources can be configured either as a series hybrid powertrain or as a so-called parallel hybrid powertrain.

In a series powertrain configuration, the generator is powered by the engine. The generator, in turn, charges the battery, which powers the motor, which is coupled to traction wheels. There is no direct mechanical torque flow path from the engine to the wheels in such a series powertrain configuration.

In a so-called parallel hybrid electric vehicle powertrain, engine power and power from the battery and the electric motor are used separately or are combined to provide traction wheel power.

In a parallel/series hybrid vehicle powertrain configuration, the characteristics of a parallel configuration and a series configuration may both be available. A portion of the engine torque in such a parallel/series hybrid configuration is delivered through a mechanical torque flow path to the traction wheels, and a portion of the engine power drives the generator, which powers the battery, so that motor power can be delivered to the traction wheels. Kinetic energy of the vehicle can be captured during engine braking, thereby storing regenerative energy in the battery.

In a parallel hybrid electric vehicle powertrain configuration, the engine can be turned off during periods of low power demand as the motor provides the sole power source for the vehicle. The engine may be disconnected from the motor, when the engine is not running, by opening a disconnect clutch. When power demand increases, the engine can be restarted and the clutch can be re-engaged.

An example of a parallel hybrid electric vehicle powertrain may be seen by referring to U.S. Pat. No. 6,735,502, which is assigned to the assignee of the present invention. An example of a parallel/series hybrid electric vehicle powertrain may be seen by referring to U.S. Pat. No. 7,013,213, which also is assigned to the assignee of the present invention.

In a parallel hybrid electric vehicle powertrain, both the engine and the motor can be directly coupled to the traction wheels through a geared transmission so that both power sources can power the vehicle. The transmission typically has multiple gear ratios. An example of a transmission of this type is an electronically controlled converterless transmission disclosed in U.S. Pat. No. 6,299,565, which also is assigned to the assignee of the present invention.

A vehicle system controller is used to implement several functions in a hybrid electric vehicle powertrain with a parallel configuration. The three most fundamental functions are (1) transfer of motor power and engine power to the wheels based on driver demand for power; (2) efficient management of the energy in the battery and engine power; and (3) system fault management.

The vehicle system controller consists of two primary components. First, it has a logical state machine that describes both the operating modes of the vehicle as well as a set of rules for transitioning between the modes. Secondly, the vehicle system controller has an output command control for vehicle system components, including the engine and the transmission for each state within the state machine.

If a transmission ratio shift occurs in a parallel hybrid electric vehicle powertrain following a driver demand for torque when the powertrain is in an electric-only drive state, an engine start event can cause undesirable momentary reduced drivability performance because of engine inertia effects and a time lag between a command for engine power and a command response.

SUMMARY OF THE INVENTION

The invention comprises a hybrid electric vehicle control method and system including a controller that is part of a control network, which executes an algorithm capable of providing improved drivability of the vehicle by making a smooth transition from a motor drive operation to an engine drive operation. It provides for timing of a transition from electric drive so that it is compatible with a transmission ratio shift interval.

During a transition from an electric drive operating state in which the electric motor is the only power source to a state in which the engine operates, the present invention executes an algorithm to determine when the engine should be started and when a transmission ratio shift should occur to meet a driver demand for traction wheel power. This ensures that drivability is not reduced in quality since it prevents an occurrence of back-to-back engine starts and shift events.

The algorithm of the invention will provide for arbitration of the powertrain variables involved in each of these events. An estimate of the time of the next engine start is made during operation of the powertrain with the motor acting as the sole source of power source. An estimate of the time of the next shift also is made. The algorithm will then calculate whether the engine start should have priority over other powertrain operating states.

The algorithm will use a calibratable value for the time interval between an engine start and the transmission shift event to keep the events separated so that a smooth transition can occur between an electric-only drive mode and a drive mode in which engine power is used. The latter mode may be either an engine-only drive mode or a mode in which both engine power and electric power are used.

In executing the algorithm, the controller network will determine first whether the powertrain is in a electric-only drive mode and whether a driver demand for power is within calibrated power limits. A predicted time to start the engine is computed if the engine is off, and a predicted time to shift the transmission ratio is computed. The engine is started if the predicted time to shift the transmission ratio is greater than the predicted time to start the engine.

BRIEF DESCRIPTION OF THE DRAWINGS

FIG. 7 is a schematic structural diagram of the software residing in the vehicle system controller during a determination of a predicted time to start the engine when the powertrain uses electric motor power solely;

FIG. 8 is a schematic structural diagram of the software residing in the vehicle system controller, which is used in a determination of an engine start priority, and which receives the predicted time to shift the transmission.

PARTICULAR DESCRIPTION OF THE INVENTION

Figure 1:
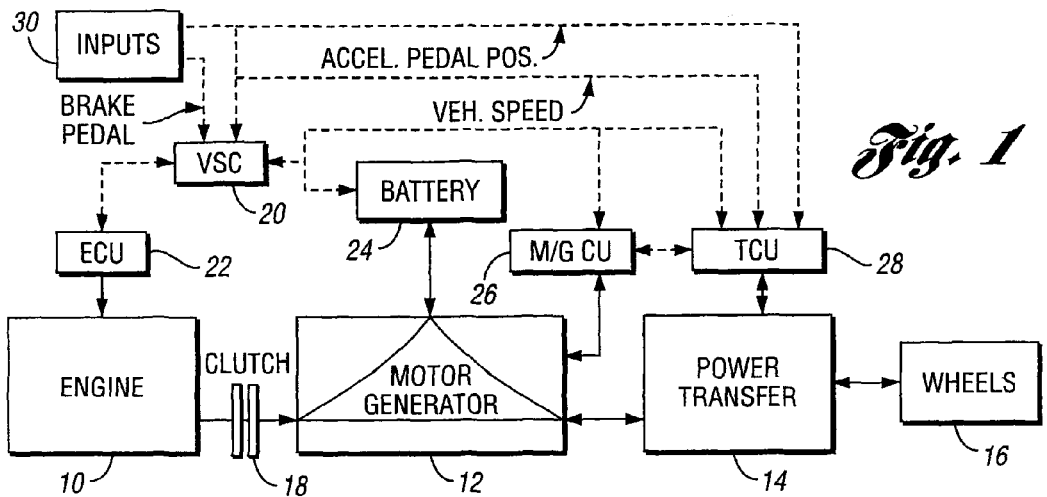
FIG. 1 is a block diagram showing in schematic fashion the components of a parallel hybrid electric vehicle powertrain.

FIG. 1 shows an example of a parallel hybrid vehicle powertrain comprising an engine 10, an electric motor-generator 12, a multiple-ratio transmission 14 and traction wheels 16. The engine crankshaft can be selectively connected to the rotor of the motor-generator 12 by a disconnect clutch 18. Engine 10 may be disconnected by clutch 18 from the motor-generator motor-generator power is used solely, at which time the engine may be turned off. In the alternative, the engine may remain in an idle state.

The power output of the motor-generator 12 is delivered to the power input shaft of transmission 14. Transmission 14 receives power input from both the engine and the generator, or from the motor-generator solely, or from the engine solely, as determined by the vehicle system controller shown at 20.

The vehicle system controller is electronically coupled to an engine control unit 22, a traction battery 24, a motor-generator control unit 26 and a transmission control unit 28. The powertrain configuration illustrated in FIG. 1 may be similar to the powertrain disclosed in U.S. Pat. Nos. 6,735,502; 6,746,366; and 7,021,409, which are assigned to the assignee of the present invention.

The algorithm executed by the present invention resides within the vehicle system controller 20.

Figure 2:
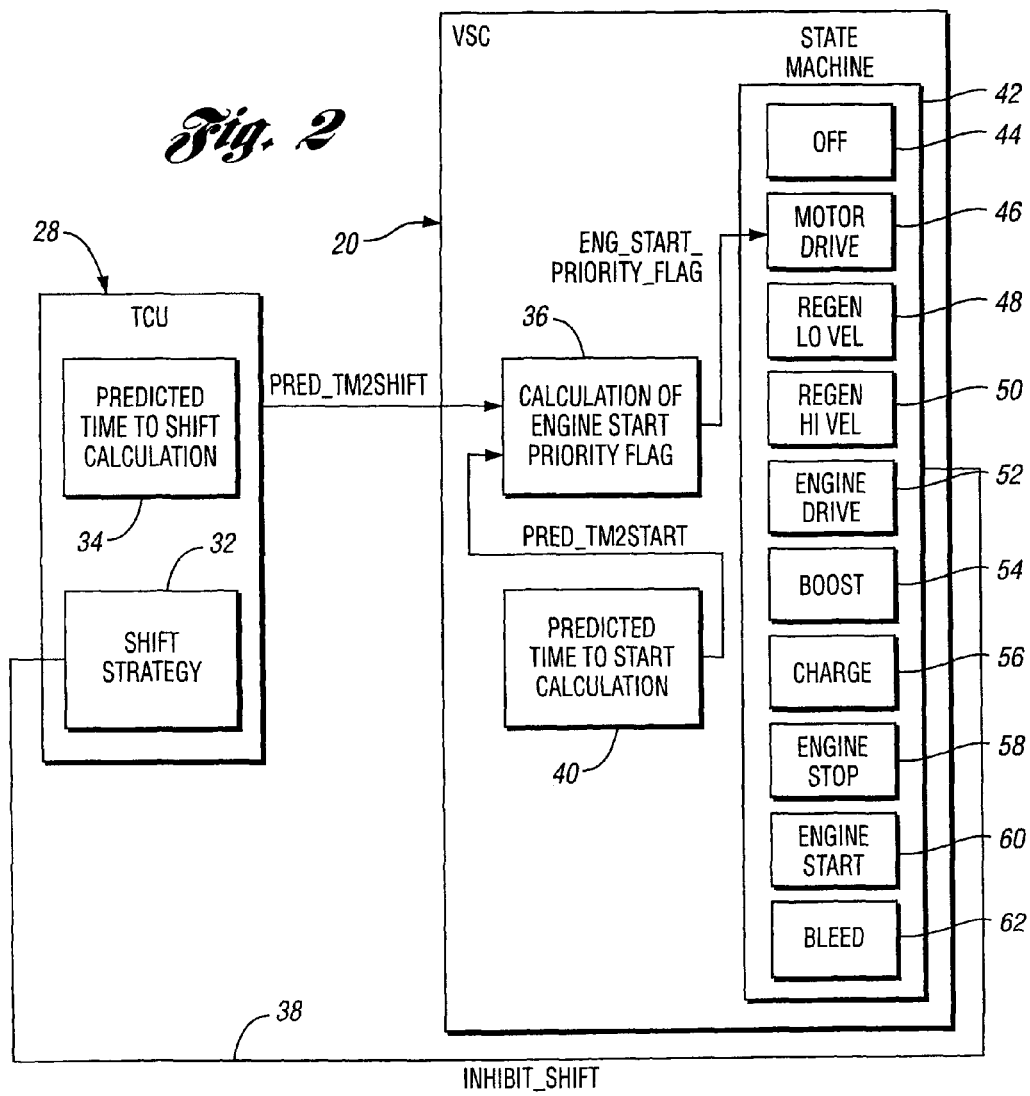
FIG. 2 is a diagram of the interface of a transmission control unit and a vehicle system controller during execution of an engine start and shift control strategy.

During operation of the powertrain in FIG. 1, when the powertrain is in the electric drive state, a transition from the electric drive shaft mode to a parallel operating mode requires the engine to be started. By estimating the time of the next engine start, and having an estimate of the predicted time of the next shift, the algorithm will calculate whether the engine start should have priority over other operating states. The engine start and the transmission shift event are kept separated in time by a calibratable amount. This is achieved as illustrated in the diagrammatic sketch of the vehicle system controller and the transmission control unit illustrated in FIG. 2.

The transmission control unit 28 and the vehicle system controller 20 receive inputs shown at 30 in FIG. 1. These inputs may include accelerator pedal position and vehicle speed developed, respectively, by an accelerator pedal position transducer and a transmission output shaft speed sensor.

The transmission control unit 28 includes shift strategy in its controller memory 32. The strategy depends upon the design of the transmission shown at 14. The transmission control unit includes also a processor portion 34 which calculates a predicted time to shift, as will be explained with reference to FIG. 5.

The calculated predicted time to shift is transmitted to a processor portion 36 of the vehicle system controller 20 where a calculation is carried out to establish an engine start priority flag. If an engine start is considered to be of a lower priority than other vehicle functions identified in FIG. 2, a shift inhibit signal is developed as shown at 38. That decision with respect to priority requires a calculation of a predicted time to start, which is carried out by processor portion 40 in the vehicle system controller. The calculation of the predicted time to start will be described subsequently with respect to FIG. 6.

The calculation of an engine start priority is distributed to an engine state machine 42, which is part of the vehicle system controller 20. The various states may include an engine off state 44, a motor drive state 46 in which the engine would be turned off and the vehicle would be powered solely by the motor, a regenerative low vehicle velocity state 48 during which regenerative power would be distributed during engine braking from the motor-generator 12 to the battery 24, and a regenerative high vehicle velocity operating state 50.

If the engine drive state should have a priority that is higher than the priorities for operation in other operating states, the engine drive state shown at 52 will be entered.

At state 54, the motor-generator will boost the output of the engine as the powertrain operates in a parallel drive mode. If the battery requires charging, the charge state 56 will be entered. The engine stop state 58 will be commanded if the powertrain operates in a motor drive mode only. If the battery is overcharged, provision is made for bleeding down the overcharge by commanding the bleed state 62.

The predicted time to start strategy will be described with respect to the schematic diagram of FIG. 7. The predicted time to start is calculated at 40 within the vehicle system controller 20. Its value represents the amount of time is seconds until an engine start will be required, as dictated by the vehicle system control energy management strategy and the driver commands at driver input section 30 of FIG. 1. This calculation of the predicted time to start is meaningful only when the vehicle is currently in a motor drive state in which the electric motor is the sole source of power at the traction wheels. If the vehicle is in any state other than a motor drive state, the value of the predicted time to start is set to zero.

As will be explained with reference to FIG. 3, and FIG. 4 a power threshold is determined. If the predicted time to start is set to zero, a power threshold at or below which the engine should be turned on is greater than the current desired transmission power input, and the desired transmission input power rate is greater than zero. If that is the case, the predicted time to start can have a meaningful non-zero value. The predicted time to start in this case is the difference between the power threshold for starting the engine and the current desired transmission power input divided by the current desired transmission input power rate.

FIG. 7 demonstrates how the strategy code is carried out. As seen in FIG. 7, the power threshold, shown at 64, is compared to the desired transmission input power 66 determined by the driver at 30. These values are compared at 68 and transferred to divisor 70. The desired transmission input power rate, which is developed from the accelerator pedal position signal, is transferred from function element 72 to the divisor 70. If it is determined at 68 that the power threshold at which the engine should be turned on is greater than the desired transmission input power, that value divided by the rate value at 72, will result in a predicted time to start at 74, which is transferred to a switch 76. A flag at 78 will indicate whether the engine is on or off. If the engine is on, the switch will interrupt the time to start signal at 74. Otherwise, the time to start signal will appear at the output 80.

FIG. 8 shows the strategy code involved in a determination of an engine start priority. The output 80, shown at FIG. 7, appears at 82 in FIG. 8. In order to account for differing vehicle operating variables and changes in environmental factors, an adjustment in the predicted time to start is calculated at 84. This is a calibrated value. At junction 86, the value of the predicted time to start is modified by subtracting the calibrated value at 84.

The predicted time to shift is determined in the vehicle system controller by calculating the vehicle speed for a given pedal position when the transmission is in a high gear, such as the fourth ratio, and the vehicle speed at the same pedal position when the vehicle is in a lower gear, such as third gear. That value is divided by a calculated vehicle acceleration. The vehicle acceleration is calculated using the filtered first derivative of the vehicle speed signal, shown in FIG. 1. That value for the time to shift is received by element 88 in FIG. 8. It is determined at relational operator 1, shown at 90, whether the predicted time to start is less than the predicted time to shift. If that is the case, an engine start signal is distributed to switch 92, as shown at 94.

If the algebraic sum at 86 is less than zero, a signal at 96 will be distributed to switch 98. Confirmation at relational operator 100 that the sum is less than zero will result in a "true" indication, represented by constant 1, which causes switch 98 to set an engine start priority flag. This starts the engine regardless of the predicted time to shift calculation. The engine start is given immediate priority.

If the predicted time to start is less than the predicted time to shift, the switch 92 will move from the "low" position corresponding to constant 2 at 104 to the "high" position corresponding to constant 3, shown at 106, so that a start signal is made available to switch 98. It is seen, therefore, that the functions diagrammatically illustrated in the upper portion of FIG. 8 can overrule the functions diagrammatically illustrated in the lower portion of FIG. 8. It is thus possible to determine whether it is better start the engine first or to allow the transmission to shift. This is done by creating an engine start priority flag within the vehicle system controller. Calculation of the engine start priority flag is a function of a calibratable value for an estimate of the amount of time to start the engine. If the predicted time to start the engine is shorter than the calibratable time to start the engine, then immediate priority to the engine start is given by setting the engine start flag high. If the difference between the predicted time to start the engine and the calibratable amount of time to start the engine is greater than the predicted time to shift the transmission, then the engine start flag is set low to allow the transmission to shift before the engine is started. Otherwise, the engine is given priority to start first.

Figure 3:
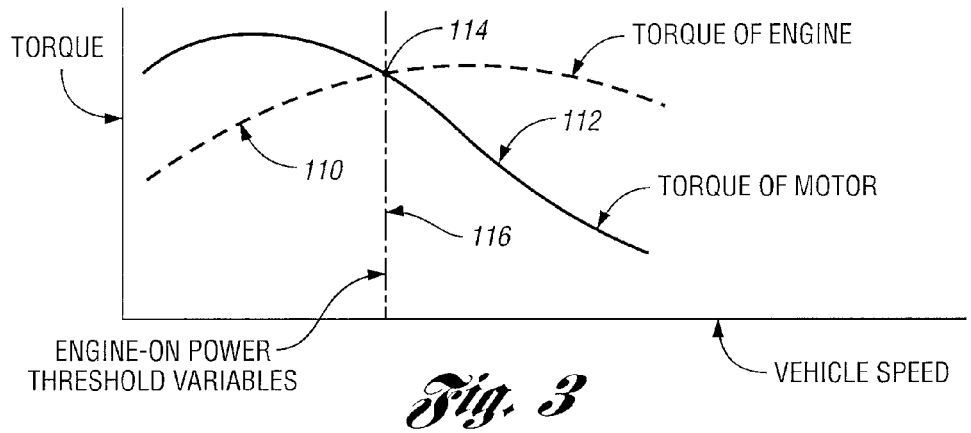
FIG. 3 is a plot showing the relationship of engine torque and vehicle speed for a typical engine and a plot of motor torque and engine speed for a typical hybrid powertrain.
Figure 4:
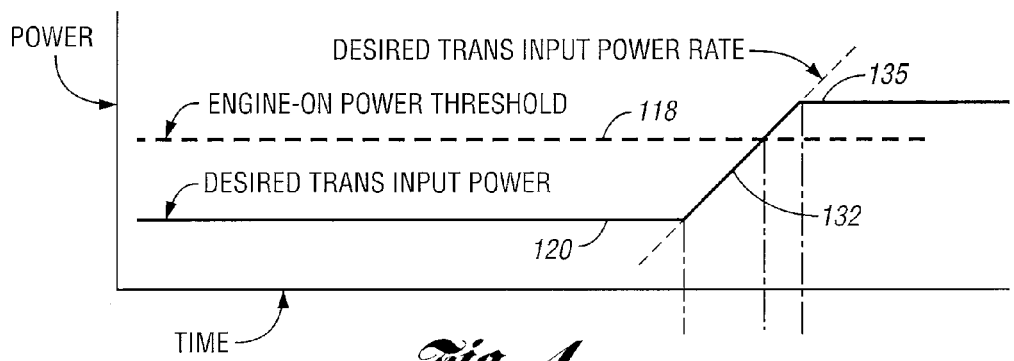
FIG. 4 is a plot showing the desired transmission input power, a calibrated engine power threshold and a desired transmission input power rate during the interval of a transmission ratio shift.

FIG. 3 demonstrates how the engine-on power threshold is determined. The plot of engine torque versus vehicle speed, shown at 110 in FIG. 3, is a typical characteristic plot for an internal combustion engine. The corresponding characteristic plot for a motor is shown at 112. At point 114, the characteristic plots for the motor and the engine intersect. It is this intersection that determines variables for computing the power threshold, as indicated at 116. The value for the power threshold in the engine-on state is indicated in FIG. 4 at 118. The desired transmission input power, indicated at 66 in FIG. 7, is plotted at 120 in FIG. 4.

Figure 5:
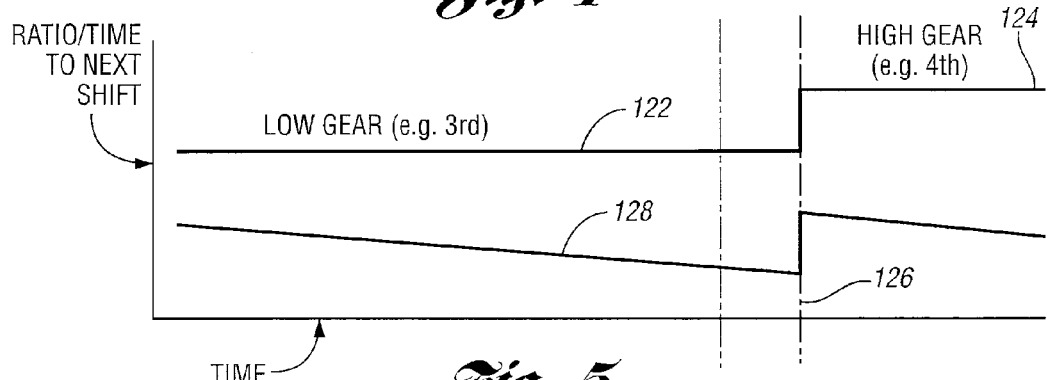
FIG. 5 is a plot of the time to the next ratio shift from a low gear ratio to a high gear ratio.

FIG. 5 is a time plot of the gear ratios before and after a shift. For purposes of illustration, the low gear ratio is indicated for third gear at 122. Following an upshift to the high gear, which may be the fourth transmission gear, the ratio is indicated at 124. The shift occurs at time 126.

The time to shift to the next ratio is plotted in FIG. 5 at 128. The time to shift value progressively decreases as the shift time 126 is approached.

Figure 6:
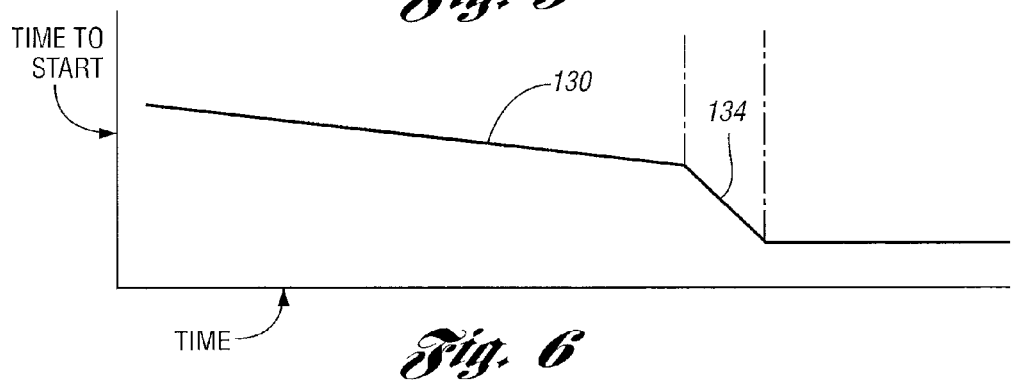
FIG. 6 is a time plot of the time to start the engine relative to the shift interval of FIG. 5.

FIG. 6 shows the plot of the predicted time to start the engine, as shown at 130 as the shift time 126 is approached. The desired transmission input power rate is computed to develop the plot 132. If the setting of the accelerator pedal remains unchanged, the plot, shown at 132, will be a straight line as indicated. As the rate line increases, the time to start will decrease at a uniform rate, as shown at 134 in FIG. 6. As the desired power input increases above an engine-on power threshold 118 to a limit value such as that shown at 135, a shift will not be allowed.

Each of the engine states has a number of outputs, one of which is "inhibit shift". This output generated by the vehicle system controller is sent to the transmission controller 28 to request that the transmission shift be inhibited while the vehicle is performing some other function. In this case, that other function would be starting the engine. Thus, the algorithm executed by the present invention improves the drivability of the vehicle by avoiding consecutive engine starts and transmission shifts.

The engine start priority flag is an input to the vehicle system controller. It modifies the inhibit shift signal during the motor drive state. The inhibit shift flag is set high if the engine start priority flag is set high, thereby inhibiting the transmission from performing a gear shift while the engine is starting. In this way, the drivability of the hybrid vehicle is improved by the strategy of the present invention by arbitrating transmission shift and engine start events.

Figure 9:
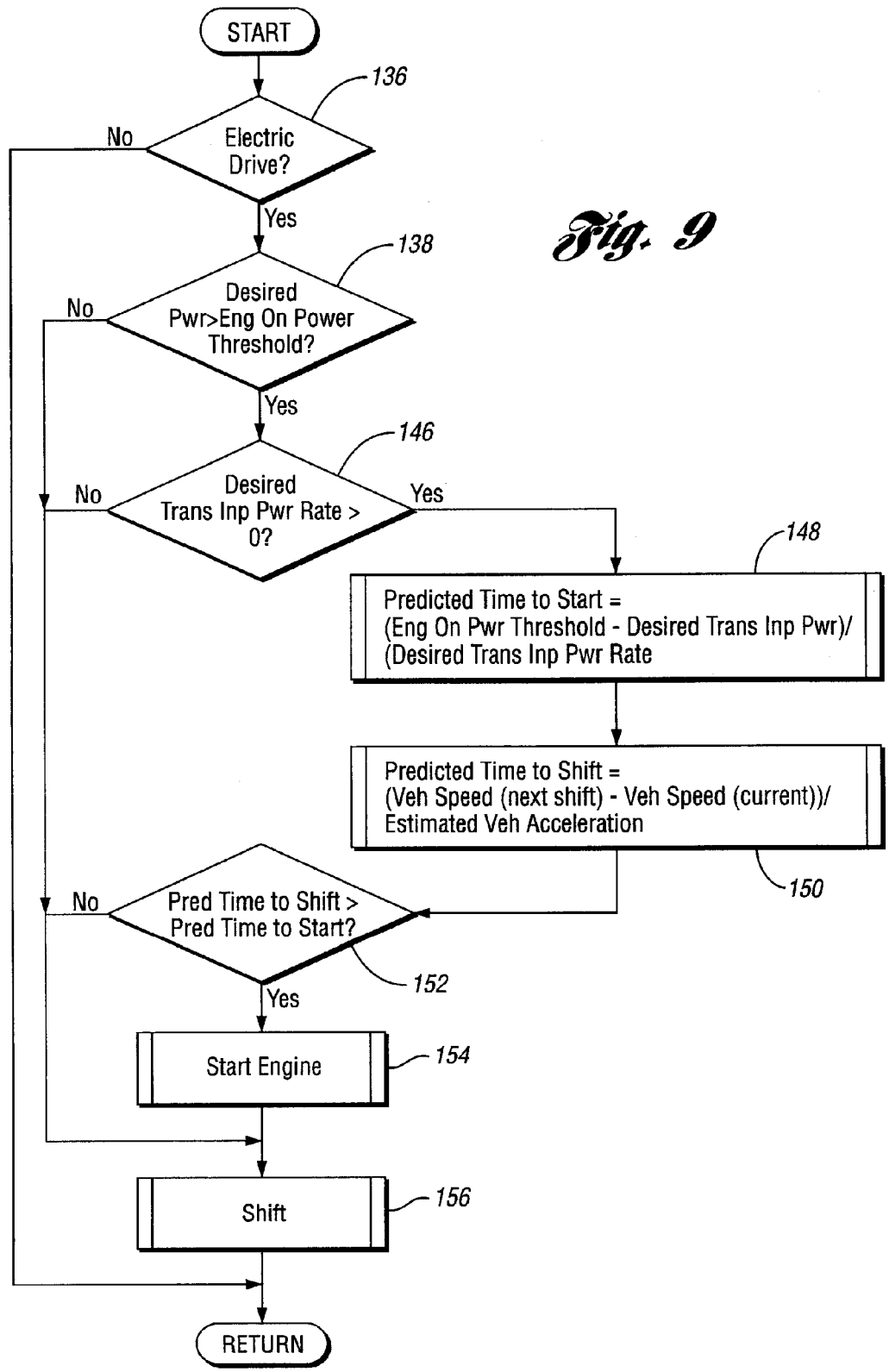
FIG. 9 is a flowchart illustrating the strategy steps executed by the controller illustrated in FIGS. 7 and 8.

FIG. 9 is a flowchart that illustrates the overall operating strategy described with reference to FIGS. 7 and 8. In FIG. 9, it is determined at decision step 136 whether the vehicle is operating in a motor drive state only. If it is not operating in a motor drive mode only, the strategy of the invention will not apply. If it is operating in a motor drive state only, it is determined at decision step 138 whether the desired power is greater than the engine-on power threshold. If it not greater than the engine-on power threshold, the routine will proceed directly to effect a ratio shift, as shown at 156.

If the desired power is less than the engine-on power threshold, a decision is made at block 146 regarding the transmission input power rate. If the desired transmission input power rate is greater than zero, the predicted time to start will be calculated at action block 148. As mentioned previously, the predicted time to start the engine is equal to the difference between the engine-on power threshold and the desired transmission input power divided by the desired transmission input power rate.

The routine then will proceed to action block 150, where the predicted time to shift is calculated by determining the difference between the vehicle speed at the upshifted ratio and the vehicle speed at the current ratio, divided by the estimated vehicle acceleration. Following the computations at action blocks 148 and 150, the routine proceeds to decision block 152, where it is determined whether the predicted time to shift is greater than the predicted time to start the engine. If it is not greater, the routine will proceed to action block 156, where a shift is initiated. If the predicted time to shift is greater than the predicted time to start, the engine will be started, as shown at 154.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A method for controlling a hybrid electric vehicle powertrain having an engine, at least one motor-generator, a multiple-ratio transmission defining parallel power flow paths to vehicle traction wheels and a controller for effecting a transition from motor-generator drive operation to engine drive operation, the method comprising the steps of:
    determining whether the powertrain is operating in motor-generator drive operation with the engine off;
    determining whether a desired power is less than a calibrated engine-on power threshold value;
    calculating a predicted time to start the engine in advance of a transmission ratio shift;
    calculating a predicted time to shift the transmission from one ratio to another ratio;
    comparing the predicted time to shift the transmission to the predicted time to start the engine;
    shifting the transmission if the predicted time to shift the transmission is not greater than the predicted time to start the engine; and
    starting the engine first if the predicted time to shift the transmission is greater than the predicted time to start the engine, a time separation between an engine start and a transmission shift effecting a smooth transition from motor-generator drive operation to engine drive operation.

2. A method for controlling a hybrid electric vehicle powertrain having an engine, at least one motor-generator, a multiple-ratio transmission defining parallel power flow paths to vehicle traction wheels and a controller for effecting a transition from motor-generator drive operation to engine drive operation, the method comprising:
    determining whether the powertrain is operating with the engine off;
    determining a desired rate of increase in a desired transmission input power with the engine off;
    determining a desired transmission input power;
    determining whether the desired transmission input power is less than a pre-calibrated engine-on power threshold;
    calculating a predicted time to start the engine in advance of a transmission ratio shift as a function of at least the desired rate of increase in transmission input power;
    determining current vehicle speed and vehicle speed following a shift;
    calculating a predicted time to shift the transmission from one ratio to another ratio as a function of at least vehicle acceleration;
    comparing the predicted time to shift the transmission to the predicted time to start the engine; and
    arbitrating priority between a shift event and an engine start event upon an increase in desired transmission input power and starting the engine first if the predicted time to shift the transmission is greater than the predicted time to start the engine, and shifting the transmission first if the predicted time to start the engine is greater than the predicted time to shift the transmission, a separation in time between an engine start and a transmission shift created by the arbitration effecting smoothness in a transition from motor-generator drive operation to engine drive operation.

3. The method set forth in claim 2 wherein a shift of the transmission in the step of calculating a predicted time to shift the transmission is an upshift from one speed ratio to a higher speed ratio.

4. The method set forth in claim 1 wherein the step of calculating a predicted time to shift the transmission from one ratio to another is a function of at least a filtered first derivative of vehicle speed.

5. The method set forth in claim 1 wherein the step of calculating a predicted time to shift the transmission from one ratio to another is a function of at least vehicle acceleration.

6. The method set forth in claim 2 wherein the step of calculating a predicted time to start the engine is determined by computing a difference between an engine-on power threshold and the desired transmission input power and dividing that difference by the desired rate of increase in desired transmission input power.

7. The method set forth in claim 2 wherein the step of calculating the predicted time to shift the transmission is determined by computing a difference between vehicle speed before a transmission ratio shift and vehicle speed after the transmission shift divided by an estimated vehicle acceleration.

8. The method set forth in claim 6 wherein the step of calculating the predicted time to shift the transmission is determined by computing a difference between vehicle speed before a transmission ratio shift and vehicle speed after the transmission shift divided by an estimated vehicle acceleration.

9. The method set forth in claim 2 wherein the step of starting the engine upon an increase in desired power is executed regardless of the predicted time to shift the transmission if the predicted time to start the engine is less than a calibrated time to start the engine after an engine-on power threshold is reached and before a power limit is reached.

10. The method set forth in claim 8 wherein acceleration is determined as a function of a filtered first derivative of vehicle speed.

11. A method for controlling a hybrid electric vehicle powertrain having an engine, at least one motor-generator, a multiple-ratio transmission defining parallel power flow paths to vehicle traction wheels and a controller for effecting a transition from motor-generator drive operation to engine drive operation, the method comprising:
    determining whether the powertrain is operating with the engine off;
    calculating a desired rate of increase in desired transmission input power;
    determining a desired transmission input power;
    determining whether the desired transmission input power is less than a pre-calibrated engine-on power threshold;
    calculating a predicted time to start the engine in advance of a transmission ratio shift as a function of at least the desired rate of increase in transmission input power;
    measuring vehicle speed;
    calculating a predicted time to shift the transmission from one ratio to another ratio as a function of at least vehicle acceleration;
    comparing the predicted time to shift the transmission to the predicted time to start the engine;
    starting the engine if the predicted time to shift the transmission is greater than the predicted time to start the engine, an engine start being separated in time from a transmission shift to improve smoothness in a transition from motor-generator drive operation to engine drive operation; and establishing immediate engine start priority over a transmission shift event upon an increase in desired power if the calculated predicted time to start the engine is shorter than a calibrated time to start the engine after an engine-on power threshold is reached and before a power limit is reached regardless of the calculated predicted time to shift the transmission; otherwise allowing the transmission to be shifted before the engine is started.

12. The method set forth in claim 11 wherein acceleration is determined as a function of a filtered first derivative of vehicle speed.

13. A control system for controlling a hybrid electric vehicle powertrain having an engine, at least one motor-generator, a battery, a multiple-ratio transmission defining parallel power flow paths to vehicle traction wheels, a powertrain controller network including a vehicle system controller for establishing and disestablishing each of a plurality of powertrain operating states including an engine-only operating state and a motor-generator-operating state and for effecting a smooth transition between the operating states;

a transmission controller in communication with the vehicle system controller in the powertrain controller network for effecting ratio shifts in the transmission in response to driver and powertrain operating input variables; and an engine controller in communication with the vehicle system controller in the powertrain controller network for establishing an engine-on state and an engine-off state in response to commands from the vehicle system controller;

the powertrain controller network being configured to predict a time to start the engine following operation of the powertrain in the motor-generator drive state with the engine off and to predict a time to shift the transmission ratio;

the powertrain controller network being configured further to separate in time an engine start event and a transmission ratio shift event, the engine being started when a predicted time to shift the transmission is greater than the predicted time to start the engine and the transmission being shifted if the predicted time to shift is not greater than the predicted time to start the engine.

14. The control system set forth in claim 13 wherein the powertrain controller network is configured further to give immediate priority to an engine start event upon an increase in desired power if the predicted time to start the engine is less than a calibrated time to start the engine after an engine-on power threshold is reached and before a power limit is reached regardless of whether the predicted time to start the engine is less than the predicted time to shift the transmission ratio, otherwise allowing the transmission to be shifted before the engine is started.

15. The method set forth in claim 1 wherein the predicted time to start the engine is compared to a calibratable amount of time to start the engine; and starting the engine before the transmission is shifted if the predicted time to start the engine is less than the calibrated amount of time to start the engine after an engine-on power threshold is reached regardless of the predicted time to shift the transmission.

16. The control system set forth in claim 13 wherein the vehicle system controller is configured further to:

(i) compare the predicted time to start the engine to a calibrated amount of time to start the engine; and (ii) starting the engine before the transmission is shifted if the predicted amount of time to start the engine is less than the calibrated amount of time to start the engine after an engine-on power threshold is reached regardless of the predicted amount of time to shift the transmission.

* * * * *